United States Patent Office 3,136,799
Patented June 9, 1964

3,136,799
ISONITRILE CHROMIUM PENTACARBONYLS
Raymond E. Maginn, Detroit, Mich., assignor to Ethyl Corporation, New York, N.Y., a corporation of Virginia
No Drawing. Filed Mar. 29, 1962, Ser. No. 183,397
10 Claims. (Cl. 260—438)

This invention relates to novel organometallic compounds and to a process for their preparation. More specifically, the invention relates to isonitrile compounds of chromium, in which the chromium atom is also bonded to five carbonyl radicals.

An object of this invention is to provide novel organometallic compounds of chromium. Another object is to provide novel compounds in which an isonitrile radical is bonded to chromium. Another object is to provide a process for the formation of the novel compounds of this invention. Additional objects will become apparent from the following discussion and claims.

The objects of this invention are accomplished by providing new chemical compounds having the formula $$R_nH_{3-n}C—NC—Cr(CO)_5$$

wherein R is a benzenoid aromatic hydrocarbon radical having six to about 13 carbon atoms and $n$ is an integer ranging in value from 2–3.

The radical R of the novel compounds of this invention can be selected from a wide variety of organic benzenoid aromatic radicals. Typically, these radicals are hydrocarbon radicals; that is, they are composed solely of carbon and hydrogen. Starting materials for the process of this invention containing these hydrocarbon radicals are preferred because they are generally less expensive than the substituted derivatives. Compounds containing other groups within these radicals can be prepared. Hence, compounds having radicals containing groups such as halides, amino, substituted amino, carboxy and nitro groups are included within the novel compounds of this invention. Examples of this type of compound are tri(3,5-dinitrophenyl)methyl isonitrile chromium pentacarbonyl, tri(3,5-dicarboxyphenyl)methyl isonitrile chromium pentacarbonyl, tri(p-aminophenyl)methyl isonitrile chromium pentacarbonyl and the like.

The aryl radicals in the compounds of this invention may be the phenyl radical or a substituted derivative thereof. The compounds, triphenylmethyl isonitrile chromium pentacarbonyl $(C_6H_5)_3CNCCr(CO)_5$ and diphenylmethyl isonitrile chromium pentacarbonyl contain the phenyl radical.

The phenyl radicals may be substituted by one or more monovalent hydrocarbon radicals. Thus, radicals such as the tolyl, 2,3-xylyl, mesityl, durenyl and pentamethyl  radicals are applicable. Higher aliphatic derivatives such as the ethylphenyl, butylphenyl, 1,3,5-triethylphenyl, heptylphenyl radicals and the like, are also applicable. The phenyl radical may be substituted by radicals such as the cyclohexyl, benzyl and cyclohexylethyl radicals. Olefinic and acetylenic bonds can exist within the side chains appended to the phenyl radical. Hence, radicals such as 3-propylenylphenyl; 3-[1,3-cyclohexadienyl]phenyl; 2-[3-butynyl]phenyl and the like are applicable.

The phenyl rings may also be substituted by one or more divalent radicals. Hence, aryl radicals derived from naphthalene, tetralin, phenanthrene and the like are applicable.

The bis(2-naphthyl)methyl isonitrile chromium pentacarbonyl compound depicted below illustrates compounds of this invention containing this type of radical.

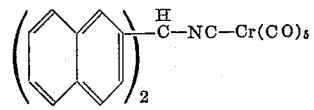

The rings in such compounds may be substituted with various monovalent organic radicals similar to those described above.

From the above discussion it is apparent that the exact structural configuration of the R radicals is not critical. No limitation as to size or complexity of the radical has been found. However, the preferred radicals have six to about 13 carbon atoms since the novel compounds comprising them are more easily prepared, and the starting materials from which they are derived are more economical and readily available.

The novel compounds containing identical aryl radicals are preferred since the starting materials for the process of this invention that contain identical radicals are more readily available. The triaryl compounds are most preferred since they are prepared in high yield after a short reaction time. Thus, the preferred compounds of this invention have the following generic formulae:

$$R_3C—NC—Cr(CO)_5$$
(II)

$$R_2HC—NC—Cr(CO)_5$$
(III)

wherein R is an aryl radical having 6 to about 13 carbon atoms. It is preferred that the aryl radicals contain an isolated benzene nucleus; that is, the substituents on the benzene ring are univalent.

Although the compounds having two or three indicated aryl radicals depicted by Formulas I and II are preferred, compounds having the formula $$RR'R''_aH_bC—NC—Cr(CO)_5$$
(IV)

can be prepared and are a part of this invention. R, R' and R'' are dissimilar radicals of the type described above and $a$ and $b$ are integers ranging in value from 0–1 such that when $a=1$, $b=0$ and when $a=0$, $b=1$. If desired, R'' can be identical to R.

The compounds of this invention are prepared by a process comprising reacting a compound having the formula $$R_nH_{3-n}CX$$

wherein R is an aryl radical having the configuration described above, $n$ is an integer ranging in value from 2 to 3, and X is a halogen atom preferably of atomic number of at least 17; with an alkali metal-etherate cyano chromium pentacarbonyl salt having the formula $$A(Y)_2Cr(CO)_5CN$$

wherein A is an alkali metal cation and Y is a bidentate ether.

The halide compounds employed in the process of this invention donate the radicals R, R' and R'' and the carbon atom to which they are bonded. These halide starting materials are selected from the class consisting of triarylmethyl and diarylmethyl halides. Applicable compounds are the triarylmethyl and diarylmethyl fluorides, chlorides, bromides and iodides. The preferred halides are the chlorides and bromides. The most preferred halides are the chlorides, since they are sufficiently reactive and are the least expensive.

The cyano chromium pentacarbonyl salts employed in this process contribute the $NCCr(CO)_5$ moiety in the new compounds. The salts are described in my co-pending application, Serial No. 102,123, filed April 11, 1961, now U.S. Patent No. 3,095,436. These salts are composed of a cyano chromium pentacarbonyl anion, $Cr(CO)_5CN^-$ and an etherated-alkali metal cation. The alkali metal cation may be either lithium, sodium, potassium, cesium or rubidium. Preferably, it is sodium or potassium, most preferably sodium. The ether molecule coordinated with the alkali metal is a bidentate ether such as dimethoxyethane, diethoxypropane, dipropoxyethane and the like. Illustrative examples of these starting materials are sodium bis(1,2-dimethoxyethane) cyano chromium pentacarbonyl, $Na(DME)_2Cr(CO)_5CN$; sodium bis(1,3-diethoxypropane) cyano chromium pentacarbonyl, $$Na(DEP)_2Cr(CO)_5CN$$

and sodium bis(1,2-dipropoxyethane) cyano chromium pentacarbonyl, $Na(DPE)_2Cr(CO)_5CN$.

The process of this invention can be illustrated by the reaction of trityl chloride and an alkali metal etherate cyano chromium pentacarbonyl salt.

$$(C_6H_5)_3CCl + A(Y)_2Cr(CO)_5CN$$
$$\rightarrow (C_6H_5)_3CNCCr(CO)_5 + ACl + 2Y$$

Usually a solvent is employed in this process. Relatively non-polar solvents that do not contain an active hydrogen are the solvents of choice. Typical solvents that can be employed in this process are ethers and acetals. It is preferred that the solvents be deoxygenated prior to use. Solvents that are non-reactive toward the products and reactants, and which readily dissolve these compounds are preferred.

The most preferred solvents are the non-cyclic ethers such as dibutylether, diethylether, diethyleneglycol dimethylether, diethyleneglycol diethylether, diethyleneglycol dipropylether, dipropyleneglycol diethylether and the like. Other ether solvents which can be employed are the bidentate non-cyclic ethers such as dimethoxyethane, diethoxyethane, dipropoxyethane and the like.

A still further class of solvents which can be employed are cyclic and acylic aliphatic hydrocarbon ketones, such as cyclopentanone and diethylketone, which preferably have a normal boiling point ranging from about 60° to about 200° C.

The process of this invention is effectively carried out at atmospheric pressure. However, higher and lower pressures can be employed. The reaction may be carried out in the presence of an inert atmosphere. For this purpose the reaction mixture is blanketed with a gas such as nitrogen, helium, argon, neon and the like. Nitrogen gas is preferred since it is more economical.

The reaction temperature is not critical and the process may be carried out at a temperature in the range of −20° C. to 100° C. Higher or lower temperature may be employed if desired. However, it is preferred that the temperature is high enough to afford a reasonable rate of reaction but not so high as to destroy the products or reactants. The preferred temperature is in the range of 15° to 35° C.

Although not necessary, it is preferred that the reaction mixture be agitated. Agitation affords a more even reaction rate and a somewhat shorter reaction time.

The time required is not a true independent variable but is dependent upon the other process variables employed. Generally, when high temperatures and agitation are employed, there will be a proportionate decrease in the reaction time. When the process of this invention is followed as illustrated by the above discussion and the following examples, reaction times in the order of 5 minutes to 5 hours usually yield satisfactory results. The preferred reaction time is in the range of 10 minutes to 3 hours. However, if it is desired, higher yields of products can be obtained in many instances if the reaction time is extended to from about 2 to about 10 days.

In general, the products of this invention are pale-yellow to orange crystalline solids. They can be readily separated from the reaction mixture by techniques familiar to those skilled in the art such as crystallization, sublimation and chromatography.

To further illustrate the process of this invention and the products produced thereby, there are presented the following examples in which all parts and percentages are by weight unless otherwise noted.

Example I

A mixture of 12.6 parts of sodium bis(dimethoxyethane) cyano chromium pentacarbonyl, 7.5 parts of trityl chloride (triphenylchloromethane), and 240 parts of ether, was shaken for 10 minutes. During that time a rapid precipitation occurred. An aqueous solution of the precipitated solids gave a white precipitate with silver nitrate and a negative Prussian blue nitrogen test. The precipitate was removed by filtration and the solvent was removed from the yellow filtrate by vacuum distillation. The orange residue was extracted several times with petroleum ether, roughly 80 part portions. The petroleum ether portions were combined and were immersed in a cooling bath. Pale yellow solids were obtained. The solids were recrystallized from petroleum ether by saturating the petroleum ether and cooling slowly in an ice bath. Six parts of pale yellow crystals of triphenyl methyl isonitrile chromium pentacarbonyl, M.P. 135–136° C. were obtained. These crystals were soluble in ether, petroleum ether, benzene and hexane but were insoluble in water. The crystals were stable and could be left indefinitely in air without apparent decomposition. An infrared spectrum had major peaks at 4.65, 4.9, 5.2, 6.75 and 6.95 microns. Analysis, calculated for $C_{25}H_{15}O_5NCr$: C, 65.1; H, 3.28; N, 3.04; Cr, 11.3. Found: C, 65.6; H, 3.43; N, 3.20; Cr, 11.3.

Example II

A mixture of 3.4 parts of sodium bis(dimethoxyethane) cyano chromium pentacarbonyl, 1.69 parts of diphenyl chloromethane, a few milligrams of sodium iodide and 40 parts of ether was stirred at room temperature for two hours. After that time the ether was displaced with 90 parts of dimethoxyethane and the mixture was refluxed for six hours. The mixture was then kept at room temperature for two days. The precipitate solids were removed by filtration and the solvent was removed from the filtrate by evaporation at reduced pressure at room temperature. The residue was taken up in petroleum ether and cooled to −78° C. The resulting crystals were filtered and recrystallized from absolute methanol. The melting point of these crystals was 212–214° C. Literature value for tetraphenylethane, M.P. 211–213° C.

The mother liquor from the first filtration of petroleum ether was evaporated to dryness and the oily residue taken up in pentane. The solution was cooled to −78° C. and then filtered. A low melting solid (M.P. 52–53° C.), diphenylmethyl isonitrile chromium pentacarbonyl, was obtained. The infrared spectrum had major peaks at 4.64, 4.85, 5.1, 6.68 and 6.86 microns. Analysis, calculated for $(C_6H_5)_2CHCH(C_6H_5)_2$: C, 93.37; H, 6.63. Found: C, 93.1; H, 6.77.

Similar results are obtained when sodium bis(1,3-diethoxy propane) cyano chromium pentacarbonyl and sodium bis(1,2-dipropoxy ethane) cyano chromium pentacarbonyl are used in the process.

Example III

Following the procedure of Example I, triphenylmethyl isonitrile chromium pentacarbonyl is prepared when potassium bis(dimethoxyethane) cyano chromium pentacarbonyl is substituted for sodium bis(dimethoxyethane) cyano chromium pentacarbonyl.

Similarly, the compound tri[2-tolyl]methyl isonitrile chromium pentacarbonyl is prepared when tris[2-tolyl] methyl chloride is used in the process. The compound, tri(biphenylyl) methyl isonitrile chromium pentacarbonyl is similarly prepared when tri(biphenylyl) bromomethane is used in the process.

Example IV

Following the procedure in Example II, with substitution of di(diethylphenyl) chloromethane for diphenylchloromethane, the product di(diethylphenyl) methyl isonitrile chromium pentacarbonyl is obtained.

Example V

The procedure of Example I is followed substituting tri(heptylphenyl) chloromethane for triphenyl chloromethane. The product tri(heptylphenyl) methyl isonitrile chromium pentacarbonyl is obtained.

Example VI

Following the procedure of Example I, the compound 2-(1,3-cyclohexadienyl) phenyl chloromethane yields the product tri[2-(1,3-cyclohexadienyl)phenyl] methyl isonitrile chromium pentacarbonyl.

Similar results are obtained when potassium bis(1,3-dipropoxyethane) cyano chromium pentacarbonyl is employed.

The novel compounds of this invention have many utilities. One of the uses of these compounds is in metal plating. In this application, a vapor of the compound is decomposed to deposit a metal containing film on a substrate material. The substrate material is heated above the decomposition temperature of the compound in a closed chamber containing the vapor of one of the compounds of this invention. A variation of this utility is dipping the substrate material into a vessel containing the compound and then heating the substrate above the decomposition temperature of the compound. The metal-containing films which are formed from our compounds can be employed as conductive surfaces such as those employed in a blended circuit or they can be used to produce a decorative effect on the substrate material.

The novel compounds of this invention are also useful chemical intermediates.

The compounds of this invention also find utility as fungicides, herbicides and pesticides. They are also useful as petroleum additives.

Having fully described the novel compounds of this invention, their mode or preparation and their many utilities, it is desired that this invention be limited only within the lawful scope of the appended claims.

This application is a continuation-in-part of Serial No. 102,123, filed April 11, 1961, now U.S. Patent No. 3,095,436.

I claim:
1. Compounds having the formula

$$R_nH_{3-n}C—NC—Cr(CO)_5$$

wherein R is a benzenoid aromatic hydrocarbon radical having six to about 13 carbon atoms and $n$ is an integer ranging in value from two to three.

2. Compounds having the formula $$R_3C—NC—Cr(CO)_5$$

wherein R is a benzenoid aromatic hydrocarbon radical having 6 to about 13 carbon atoms.

3. Compounds having the formula $$R_2HC—NC—Cr(CO)_5$$

wherein R is a benzenoid aromatic hydrocarbon radical having 6 to about 13 carbon atoms.

4. Triphenylmethyl isonitrile chromium pentacarbonyl.
5. Diphenylmethyl isonitrile chromium pentacarbonyl.
6. Process for the preparation of a compound of claim 1, said process comprising reacting a compound having the formula $$R_nH_{3-n}CX$$

wherein R is a benzenoid aromatic hydrocarbon radical having 6 to about 13 carbon atoms, $n$ is an integer having a value from 2 to 3, and X is a halogen atom selected from the class consisting of chlorine, bromine and iodine, with a salt having the formula $$A(Y)_2Cr(CO)_5CN$$

wherein A is an alkali metal cation and Y is a bidentate ether selected from the class consisting of dimethoxyethane, 1,3-diethoxypropane, and 1,2-dipropoxyethane.

7. Process for the preparation of a compound of claim 2, said process comprising reacting a compound having the formula $R_3CX$, wherein R is a benzenoid aromatic hydrocarbon radical having 6 to about 13 carbon atoms, and X is a halogen atom selected from the class consisting of chlorine, bromine and iodine; with a salt having the formula $$A(Y)_2Cr(CO)_5CN$$

wherein A is an alkali metal cation and Y is a bidentate ether selected from the class consisting of dimethoxyethane, 1,3-diethoxypropane, and 1,2-dipropoxyethane.

8. Process for the preparation of a compound of claim 3, said process comprising reacting a compound having the formula $R_2HCX$, wherein R is a benzenoid aromatic hydrocarbon radical having 6 to about 13 carbon atoms, and X is a halogen atom selected from the class consisting of chlorine, bromine and iodine; with a salt having the formula $$A(Y)_2Cr(CO)_5CN$$

wherein A is an alkali metal cation and Y is a bidentate ether selected from the class consisting of dimethoxyethane, 1,3-diethoxypropane, and 1,2-dipropoxyethane.

9. Process for the preparation of triphenylmethyl isonitrile chromium pentacarbonyl, said process comprising reacting sodium bis(dimethoxyethane) cyanochromium pentacarbonyl with trityl chloride.

10. Process for the preparation of diphenylmethyl isonitrile chromium pentacarbonyl, said process comprising reacting sodium bis(dimethoxyethane) cyanochromium pentacarbonyl with diphenyl chloromethane.

References Cited in the file of this patent

Chemische Berichte, vol. 89, No. 3, March 1956, pages 616–619.